Feb. 23, 1965         P. E. YOST         3,170,658
RAPID CONTROLLED BALLOON INFLATION MECHANISM
Filed Sept. 5, 1961
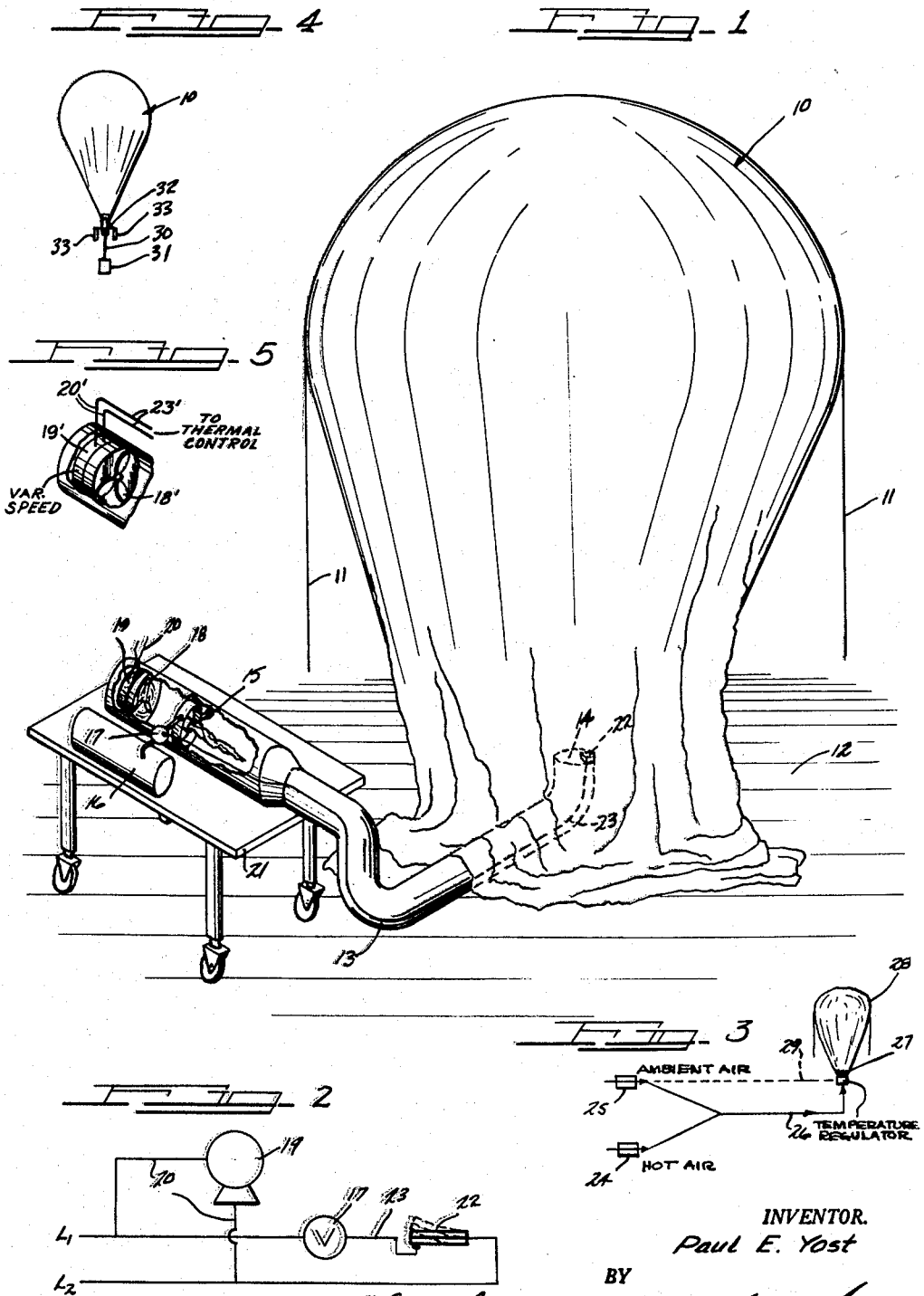
INVENTOR.
Paul E. Yost
BY
ATTORNEYS

United States Patent Office 3,170,658
Patented Feb. 23, 1965

3,170,658
RAPID CONTROLLED BALLOON INFLATION MECHANISM
Paul E. Yost, Sioux Falls, S. Dak., assignor to Raven Industries, Inc., Sioux Falls, S. Dak., a corporation of South Dakota
Filed Sept. 5, 1961, Ser. No. 136,061
2 Claims. (Cl. 244—98)

The present invention relates to an improved method and apparatus for inflating a balloon with a heated lifting gas.

The size of balloons which can be flown practically has been increased and balloons of ten million cubic feet have been constructed and flown. Balloons carrying pay loads of as much as 9,000 lbs. have been flown, and experiments show that heavier loads can be carried. These large balloons have heretofore been filled with lighter-than-air lifting gas which is provided in compressed gas containers. This arrangement necessitates long periods of inflation before the balloon is released and requires complicated connections and conduits. It also requires the balloon be filled when there is a minimum amount of surface wind and requires that the balloon be held by strong control lines during inflation. This has frequently meant that the balloons can be filled only in shielded areas such as deep depressions in the ground, or behind wind shields, and during early morning hours or times of the day when there is substantially no surface wind. The cost of the inflating gas and the cost of the inflating operation is expensive. The use of large balloons and flights capable of carrying heavy pay loads has been made possible by improved lightweight plastic balloon materials, which have heretofore been usable for only single flights. Because of the expense involved and the time consumed in inflation, and the complications necessarily involved in inflation and launching, large balloons have been used substantially solely for scientific and instrumentation flights.

A feature of the present invention is the provision of an inflating system which makes it possible to use heated air as a lifting gas for lightweight plastic balloons, and thereby avoiding the complications and expense involved with inflation with lighter-than-air gases, making extremely heavy load carrying balloons practical for carrying commercial cargo.

A further feature is the method of inflating a balloon using a relatively large air conduit and fan for inflating a balloon to give it sufficient free lift to get off the ground in a very short time, thereby avoiding the problems of slow inflation.

An object of the present invention is to provide an improved balloon inflation method and apparatus which makes it possible to inflate balloons in a far shorter time than has heretofore been possible thereby avoiding the difficulties encountered when a balloon must be exposed to surface winds over very long periods of inflation.

A further object of the invention is to provide an inflation method and mechanism for safely inflating balloons formed of lightweight plastic materials with a heated lifting gas without danger from the heat of the gas.

A still further object of the invention is to provide an inflation system for rapidly inflating large balloons of all types.

A still further object of the invention is to provide an improved method and apparatus for inflating balloons by providing a heated lifting gas generated by a burner and forcing a large volume of flow of heated air into a balloon, measuring the temperature of the heated air as it enters the balloon and controlling the temperature maintaining a predetermined safe limit which will not damage the balloon material.

Other objects, advantages and features will become more apparent with the teaching of the principles of the present invention in connection with the disclosure of the preferred embodiments thereof in the specification, claims and drawings, in which:

FIGURE 1 is a perspective view, shown in somewhat schematic form, of a balloon being inflated in accordance with the principles of the present invention;

FIGURE 2 is a wiring diagram illustrating an electrical control arrangement for the inflation mechanism;

FIGURE 3 is a schematic illustration showing another way of delivering controlled heated lifting fas for inflating a balloon;

FIGURE 4 is a side elevational view showing the balloon in flight;

FIGURE 5 is a fragmentary view shown in somewhat schematic form of an alternate arrangement for controlling air flow.

As shown on the drawings:

FIGURE 1 illustrates a balloon 10 being inflated with a heated lifting gas and control lines 11 may steady the balloon until it is released. The balloon is supported on a ground surface 12 and an inflation conduit 13 directs heated lifting gas into the interior of the balloon 10.

The inflation conduit or tube 13 is of substantial size and is shown as having an open end 14 which is merely inserted into the open lower end of the balloon 10 without the necessity of providing gas diffusion mechanism, asbestos material protection sleeves, or other equipment. The inflation tube is positioned within the balloon and the heated gas flows directly into the balloon and at the beginning of inflation will be directed against the surface of the balloon material. This can be accomplished inasmuch as the temperature of the heated gas is maintained below a predetermined safe temperature which will not damage the balloon material.

The balloon is formed of a lightweight plastic, and may be made by various known arrangements such as by gores seamed to each other at their edges. For single flights wherein the balloon envelope is dispensable, a lightweight material such as polyethylene may be employed on the order of three-fourths or one mil in thickness. For cargo flights such as for lifting and transporting commercial loads, a balloon material which has a scuff proof exterior and a gas impervious interior is well suited. The balloon material then has an outer layer which is gas pervious but which has sufficient tensile strength for the balloon envelope and which is not susceptible to scuffs or tears. A woven lightweight nylon fabric is well suited or other fabrics formed of cotton or lightweight plastic threads may be employed. The inner layer which is laminated to the outer layer is of a thin plastic to prevent the escape of gas through the balloon wall. This material permits repeated flights with a single balloon envelope.

Lifting gas is delivered through the inflation tube 13 from a burner 15 and a fan 18. The burner is operated from fuel from a fuel container 16 and flow to the burner is controlled by a regulating valve 17. Compressed gaseous fuels such as propane are well suited although gasoline or other petroleum products or other fuels for the burner 15 may be employed.

The fan 18 is suitably driven by an electric motor 19 having electrical leads 20.

As shown in FIGURES 1 and 2, a temperature sensitive control member 22 is positioned to measure the temperature of the lifting gas, and is shown as positioned in the opening 14. The control may be in the form of a regulating switch such as operated by a bimetal member. The control member or control switch 22 is arranged to operate the valve 17 so that the temperature of the heated lifting gas flowing into the balloon will be maintained below a predetermined temperature so that it will not damage the plastic of the balloon.

For example, the inner layer of the balloon may be formed of such plastic materials as polyethylene, Mylar or Saran. The temperature of the inflating gas is then maintained below a limit which would soften or otherwise damage the plastic balloon material. If Mylar is employed, the temperature control switch may be set to open at a safe level or may, for example, be set to open at 350° F. so that the temperature of the lifting gas will not exceed that temperature.

It will be understood that a graduated control valve 17 may be employed with a graduated control switch 22 so that the valve will be closed an increasing amount as the temperature approaches the predetermined safe limit, and opened an increasing amount as the temperature varies below said predetermined limit. This arrangement will of course tend to maintain a more constant temperature of the lifting gas. In other words the heated gas supply mechanism is controlled as a function of the temperature of the gas supplied to the balloon to maintain the temperature substantially constant just below the predetermined safe limit for the balloon material.

The temperature of the lifting gas is preferably controlled by control of the burner, although control may be obtained by control of the flow of air delivered by the fan to mix with the heated gases of the burner. For example, the speed of the fan motor 19 may be controlled. The control switch 22 is shown connected to the control valve 17 through electrical wiring 23, and in the event fan motor 19 were to be controlled, the wiring 23 would be similarly connected to the fan motor to increase the speed of the fan as the temperature increases and decrease the speed of the fan as the temperature decreases. This arrangement is shown in FIGURE 5 wherein wiring 23' from a switch similar to the switch 22, not shown, is connected to leads 20' leading a variable speed fan motor 19' having a fan 18'.

FIGURE 3 illustrates another arrangement for controlling the temperature of the inflating gas, and 24 shows a hot air source with a fan and burner. An ambient air source with a fan 25 is provided and the air sources mix at 26 to flow in the base of a balloon 28. A temperature regulator 27 is connected by wiring 29 to the ambient air fan 25 and by controlling this fan, the temperature of the mixed lifting gas flowing into the balloon can be controlled. As the temperature of the lifting gas increases, the flow of ambient air from the fan 25 can be increased, and as the temperature decreases, the flow of ambient mixing air from the fan 25 can be decreased.

Inflation does not necessarily have to be made through the base of the balloon and can be made through an inflation opening at the side of large balloons.

While the burner is shown in its preferred arrangement as being located downstream from the fan, in some installations it may be desirable to position the burner upstream from the fan so that air is drawn over the burner.

In operation the collapsed balloon is positioned on a supporting surface with load lines attached, and the inflation mechanism is positioned adjacent the balloon with the inflation tube projected into the base of the balloon or into an inflation opening. The fan 18 is started and the burner 15 is started, and the balloon is then rapidly inflated. As soon as the free lift of the balloon exceeds the weight of the pay load the balloon can be released. Further inflation to keep the balloon aloft can be obtained from gas generating mechanism carried with the balloon. This may be in the form of a hot air gas generator or other mechanism for providing lifting gas to the balloon.

It is contemplated that the principles of temperature control may also be employed with gas generating mechanism which is carried aloft with the balloon. In such an arrangement the burner usually will be used without a fan and a limited amount of air delivered to the balloon with the burning gases by aspiration. A control will be provided for regulating the burner so as to maintain the temperature of the gases flowing into the balloon at a safe predetermined limit. In some cases quick launching may be accomplished with the hot air inflator shown, and further inflation occurs aloft from compressed helium or hydrogen tanks which are later dropped.

The temperature responsive control 22 may of course be positioned along the inflation tube 13 at other locations and is not limited to being at the tube outlet.

FIGURE 4 shows a balloon 10 after launching with a load line 30 below the balloon carrying a payload 31. The balloon is sustained in flight by a burner 32 supplied from fuel tanks 33. The balloon has an open bottom and heated gases from the burner 32 pass up through the opening with aspirated air. A control, not shown, will be located above the burner in the lower open end of the balloon to control a valve, also not shown, to the burner so that the gas is maintained at a safe temperature for the balloon material. With this arrangement the burner can be set up close to the balloon and it is unnecessary to provide protective skirts or other covering for the balloon material where the heated gas enters.

Thus it will be seen that I have provided an improved system for rapidly inflating balloons which meets the objectives and advantages above set forth. The invention makes possible the use of hot air as a lifting gas with lightweight plastic balloon materials. As will be recognized from the foregoing an air conduit of a very large size can be employed with a large fan to very rapidly give the balloon the free lift is needs to get off the ground, thus avoiding the complications and problems that occur with the usual slow gas inflation.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A mechanism for launching and flying a balloon comprising,
   a large capacity air conduit having a flexible portion and a discharge tube end for insertion into an opening in a balloon,
   a high capacity blower adapted for operation on the ground connected to said conduit for delivering a large volume of air at a predetermined flow rate,
   a burner means for said air conduit heating the air flowing through the conduit,
   a fuel supply line connected to the burner means,
   a ground located fuel supply connected to the supply line,
   valve means for controlling the flow of fuel to the burner means through said fuel line and limiting operation of the burner means maintaining the temperature of air flowing through the conduit at a safe maximum level relative to the material of the balloon, and a gas generating burner attached to the balloon for carrying aloft having a relatively low gas delivery providing a heated lifting gas for the balloon after it has been launched.

2. A mechanism for launching and flying a balloon in accordance with claim 1 including a thermal element positioned in the proximity of said discharge tube end and connected to the valve means controlling the flow of fuel to the burner means for maintaining the temperature of the air at said safe maximum level.

References Cited by the Examiner

UNITED STATES PATENTS

| | | | |
|---|---|---|---|
| 185,094 | 12/76 | Fewkes | 236—93 |
| 1,682,961 | 9/28 | Hall | 244—97 |
| 1,979,368 | 3/31 | Rumbarger | 23—259.5 |
| 2,194,713 | 3/40 | Mitchell | 263—19 |
| 2,303,843 | 12/42 | Knoblauch | 236—15 |
| 2,606,014 | 8/52 | Baumann | 263—19 |
| 2,780,414 | 2/57 | De Heer | 236—15 |

FOREIGN PATENTS 4,708 of 1910 Great Britain.

MILTON BUCHLER, *Primary Examiner.*

ANDREW H. FARRELL, *Examiner.*